(12) United States Patent
Park

(10) Patent No.: US 8,631,268 B2
(45) Date of Patent: Jan. 14, 2014

(54) SLAVE DEVICE, SYSTEM INCLUDING MASTER DEVICE AND SLAVE DEVICE, METHOD FOR OPERATING THE SAME, AND CHIP PACKAGE

(75) Inventor: Nak-Kyu Park, Gyeonggi-do (KR)

(73) Assignee: Hynix Semiconductor Inc., Gyeonggi-do (KR)

( * ) Notice: Subject to any disclaimer, the term of this patent is extended or adjusted under 35 U.S.C. 154(b) by 412 days.

(21) Appl. No.: 12/833,503

(22) Filed: Jul. 9, 2010

(65) Prior Publication Data

US 2011/0291713 A1    Dec. 1, 2011

(30) Foreign Application Priority Data

May 28, 2010   (KR) .................. 10-2010-0050286

(51) Int. Cl.
*G06F 1/24*       (2006.01)
*G06F 1/04*       (2006.01)
*G06F 11/00*      (2006.01)

(52) U.S. Cl.
USPC ........................................................ 713/503

(58) Field of Classification Search
USPC ................... 375/219, 221, 259, 356
See application file for complete search history.

(56) References Cited

U.S. PATENT DOCUMENTS

2007/0025481 A1\* 2/2007 Ryu et al. ...................... 375/354
2007/0258554 A1   11/2007 Sidiropoulos
2010/0020909 A1\* 1/2010 Jung et al. ..................... 375/371

FOREIGN PATENT DOCUMENTS

KR     1020090132871      12/2009

OTHER PUBLICATIONS

Notice of Preliminary Rejection issued from Korean Intellectual Property Office on May 31, 2011.

\* cited by examiner

*Primary Examiner* — Kim Huynh
*Assistant Examiner* — Austin Hicks
(74) *Attorney, Agent, or Firm* — IP & T Group LLP

(57) ABSTRACT

A slave device communicating with a master device includes a transmission unit configured to transmit a signal to the master device through a communication channel, a calibration unit configured to measure a flight time of a calibration signal which is transmitted to the master device and fed back through a calibration channel coupled to the master device, and a transmission delay unit configured to delay the signal transmitted from an internal circuit of the slave device to the transmission unit by a delay value determined according to the measurement result of the calibration unit.

12 Claims, 10 Drawing Sheets

SLAVE DEVICE, SYSTEM INCLUDING MASTER DEVICE AND SLAVE DEVICE, METHOD FOR OPERATING THE SAME, AND CHIP PACKAGE

CROSS-REFERENCE TO RELATED APPLICATIONS

The present application claims priority of Korean Patent Application No. 10-2010-0050286, filed on May 28, 2010, which is incorporated herein by reference in its entirety.

BACKGROUND OF THE INVENTION

Exemplary embodiments of the present invention relate to a system including a slave device and a master device.

Packaging technology of semiconductor elements has been continuously developed according to a demand for miniaturization and high capacity. Recently, a variety of technologies for a stacked semiconductor package capable of satisfying mounting efficiency as well as the miniaturization and high capacity are being developed.

The stacked semiconductor package may be fabricated by the following methods. First, individual semiconductor chips may be stacked, and then packaged at once. Second, individual semiconductor packages may be stacked. The individual semiconductor chips of the stacked semiconductor package are electrically coupled through metallic wires or through silicon vias (TSV).

However, in the conventional stacked semiconductor package using metallic wires, since the electrical signal exchange is performed through the metallic wires, the speed is low. Furthermore, since a large number of wires are used, electrical characteristic degradation may occur. Furthermore, since an additional area for forming the metallic wires is required in a substrate, the size of the package may increase. Furthermore, since a cap for wire bonding is required between the semiconductor chips, the height of the package may increase.

Recently, a stacked semiconductor package using a TSV has been proposed. In general, the stacked semiconductor package is fabricated by the following method. First, a via hole is formed in a semiconductor chip so as to pass through the semiconductor chip, and a through electrode called a TSV is formed by filling the via hole with a conductive material. Then, an upper semiconductor chip and a lower semiconductor chip are electrically coupled through the through electrode.

FIG. 1A is a block diagram illustrating a coupling state between a master device and slave devices. FIG. 1B is a diagram illustrating a state in which the slave devices are stacked and coupled to the master device.

The master device 100 refers to a device which controls the slave devices, and the slave devices DEV(1), DEV(2), . . . , DEV(i), DEV(j), and DEV(k) refer to devices which are controlled by the master device 100. An example of the master device 100 and the slave devices DEV(1), DEV(2), . . . , DEV(i), DEV(j), and DEV(k) is a memory controller and memory devices such as DRAMs and flash memories. FIGS. 1A and 1B illustrate a memory controller as the master device 100 and memory devices as the slave devices DEV(1), DEV (2), . . . , DEV(i), DEV(j), and DEV(k).

Referring to FIG. 1B, the respective slave devices DEV(1), DEV(2), . . . , DEV(i), DEV(j), and DEV(k) are stacked and formed, and are coupled to the master device 100 through an interposer 110. Pillars formed through the stacked slave devices DEV(1), DEV(2), . . . , DEV(i), DEV(j), and DEV(k) include TSVs through which signals (data) are transmitted, that is, which form channels. The entire system illustrated in FIG. 1B may be implemented in one semiconductor chip package, and only the stacked slave devices may be implemented in one semiconductor chip package.

FIG. 2 is a diagram illustrating the channels formed as the TSVs between the master device 100 and the slave devices DEV(i), DEV(j), and DEV(k) and RLC (resistance, inductance, and capacitance) components of the channels.

Referring to FIG. 2, the respective channels have the RLC components. Therefore, the signals (data) transmitted through the channels may be delayed. The delay increases in proportional to the distance between the devices. That is, a flight time of a signal between the master device 100 and the slave device DEV(i) is longer than a flight time of a signal between the master device 100 and the slave device DEV(k). For reference, in FIG. 2, Tx represents transmission terminals provided in the master device 100 and the slave devices DEV (i), DEV(j), and DEV(k), and Rx represents reception terminals provided in the master device 100 and the slave devices DEV(i), DEV(j), and DEV(k).

FIG. 3 is a diagram showing timing variations in signal transmission between the master device 100 and the slave devices DEV(i), DEV(j), and DEV(k), which occur depending on differences in channel length.

In FIG. 3, CMD represents a command applied from the master device 100 to the slave devices DEV(i), DEV(j), and DEV(k), D represents data which the master device 100 transfers to the slave devices DEV(i), DEV(j), and DEV(k), and Q represents data which the slave devices DEV(i), DEV(j), and DEV(k) transfer to the master device 100. The data Q are generated when the slave devices DEV(i), DEV(j), and DEV (k) processes the data D according to the command D.

Referring to FIG. 3, the command and the data D transferred from the master device 100 to the slave device DEV(i) have a flight time of $X(i)$. When the slave device DEV(i) transfers the data Q to the master device 100 in response to the command CMD and the data D, the data Q has a flight time of $X(i)$. Therefore, while the data are exchanged between the master device 100 and the slave device DEV(i), the flight time is $2*X(i)$. Similarly, a flight time between the master device 100 and the slave device DEV(j) is $2*X(j)$, and a flight time between the master device 100 and the slave device DEV(k) is $2*X(k)$.

That is, the flight time of the signal may differ depending on with which device the master device 100 communicates among the slave devices DEV(i), DEV(j), and DEV(k), and the timing of transmission or reception of a specific signal (data) may be significantly varied.

SUMMARY OF THE INVENTION

An embodiment of the present invention is directed to a system which is capable of reducing a timing variation between a master device and a slave device.

In accordance with an exemplary embodiment of the present invention, a slave device for communicating with a master device includes a transmission unit configured to transmit a signal to the master device through a communication channel, a calibration unit configured to measure a flight time of a calibration signal which is transmitted to the master device and fed back through a calibration channel coupled to the master device, and a transmission delay unit configured to delay the signal transmitted from an internal circuit of the slave device to the transmission unit by a delay value determined according to the measurement result of the calibration unit.

In accordance with another exemplary embodiment of the present invention, a system includes a master device, a plurality of slave devices configured to be controlled by the master device, a communication channel between the master device and the plurality of slave devices, and a calibration channel between the master device and the plurality of slave devices. Here, each of the slave devices includes a calibration unit configured to measure a flight time of a calibration signal which is transmitted to the master device and fed back from master device through the calibration channel, and to control a delay amount of a signal to be transmitted to the master device.

In accordance with yet another exemplary embodiment of the present invention, there is provided a method for operating a system including a master device and a slave device. The method includes setting a initial delay value to each of the slave devices for data to be transmitted to the master device, transmitting calibration signals from each of slave devices to the master device, receiving the calibration signals which the master device feed back to each of slave devices, measuring a flight time of the calibration signals; and adjusting a delay value of each slave device from the initial delay value to a value which is in inverse proportion to each flight time.

DESCRIPTION OF SPECIFIC EMBODIMENTS

Figure 1A:
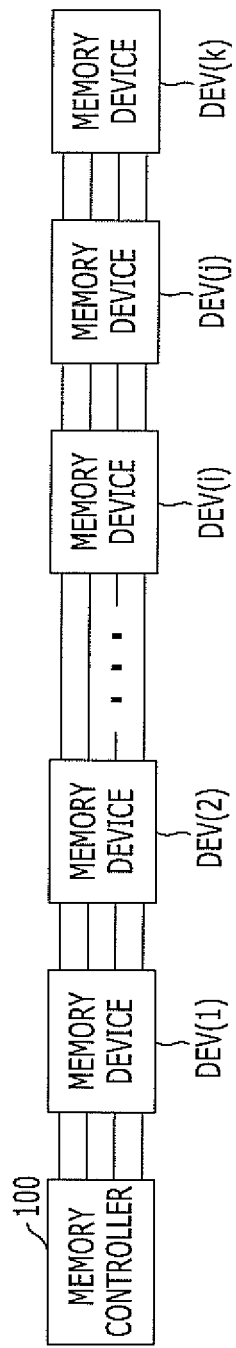
FIG. 1A is a block diagram illustrating a coupling state between a master device and slave devices.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

Figure 4:
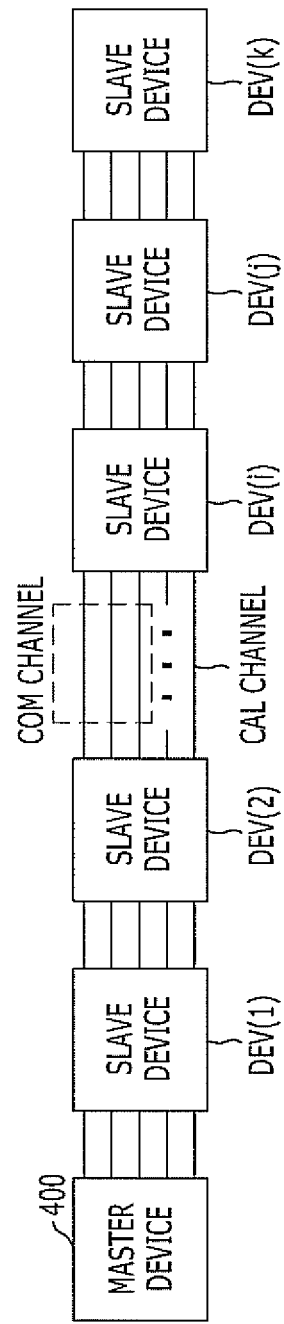
FIG. 4 is a diagram illustrating the coupling state between a master device and slave devices in accordance with an embodiment of the present invention.

FIG. 4 is a diagram illustrating the coupling state between a master device 400 and slave devices DEV(1), DEV(2), . . . , DEV(i), DEV(j), and DEV(k) in accordance with an exemplary embodiment of the present invention.

Referring to FIG. 4, a calibration channel CAL_CHANNEL as well as communication channels COM_CHANNEL is provided between the master device 400 and the slave devices DEV(1), DEV(2), . . . , DEV(i), DEV(j), and DEV(k). The calibration channel CAL_CHANNEL refers to a channel for measuring a flight time of a signal to adjust a difference in flight time of a signal, which occurs depending on distances between the master device 400 and the slave devices DEV(1), DEV(2), . . . , DEV(i), DEV(j), and DEV(k).

The flight time of a signal of each of the slave devices DEV(1), DEV(2), . . . , DEV(i), DEV(j), and DEV(k) is measured through the calibration channel CAL_CHANNEL and controls a delay value of a communication signal to be transmitted to the master device through the communication channel COM_CHANNEL by using the measured flight time. Specifically, as the measured flight time of the signal gets longer, the delay values of the slave devices DEV(1), DEV(2), . . . , DEV(i), DEV(j), and DEV(k) are controlled to small values. As a result, the slave device DEV(k) having a long flight time has a delay time set to a small value, and the slave device DEV(1) having a short flight time has a delay time set to a large value. Therefore, the times required when the signals are exchanged between the master device 400 and the slave devices DEV(1), DEV(2), . . . , DEV(i), DEV(j), and DEV(k) may be substantially equal. This will be described below in detail.

Figure 1B:
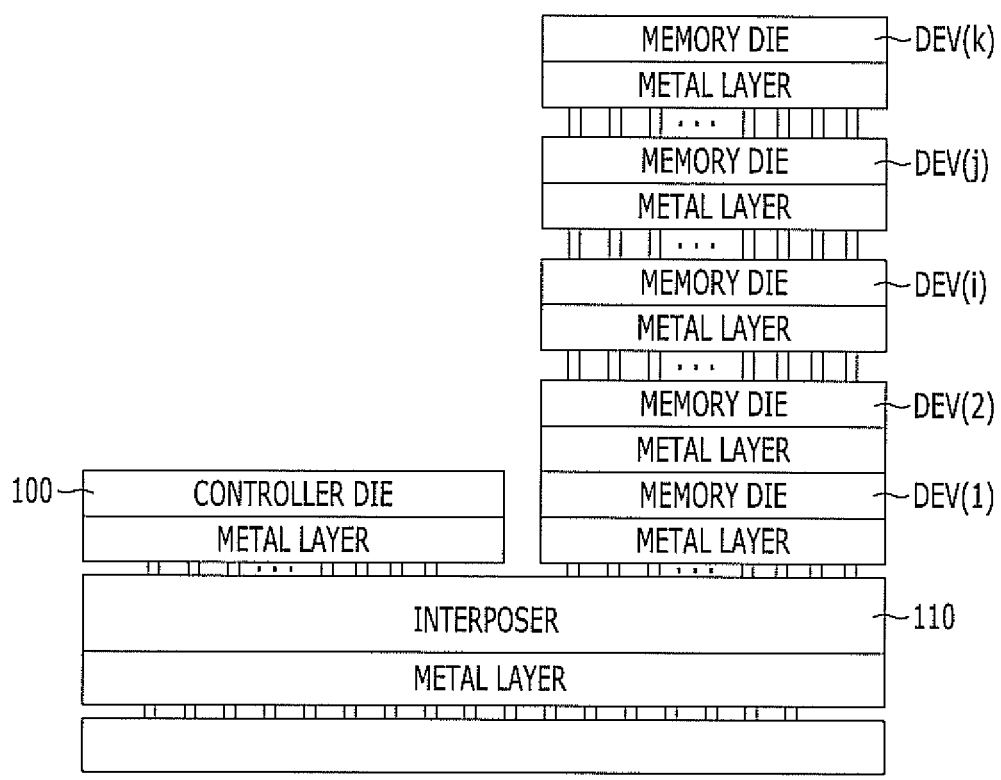
FIG. 1B is a diagram illustrating a state in which the slave devices are stacked and coupled to the master device.
Figure 2:
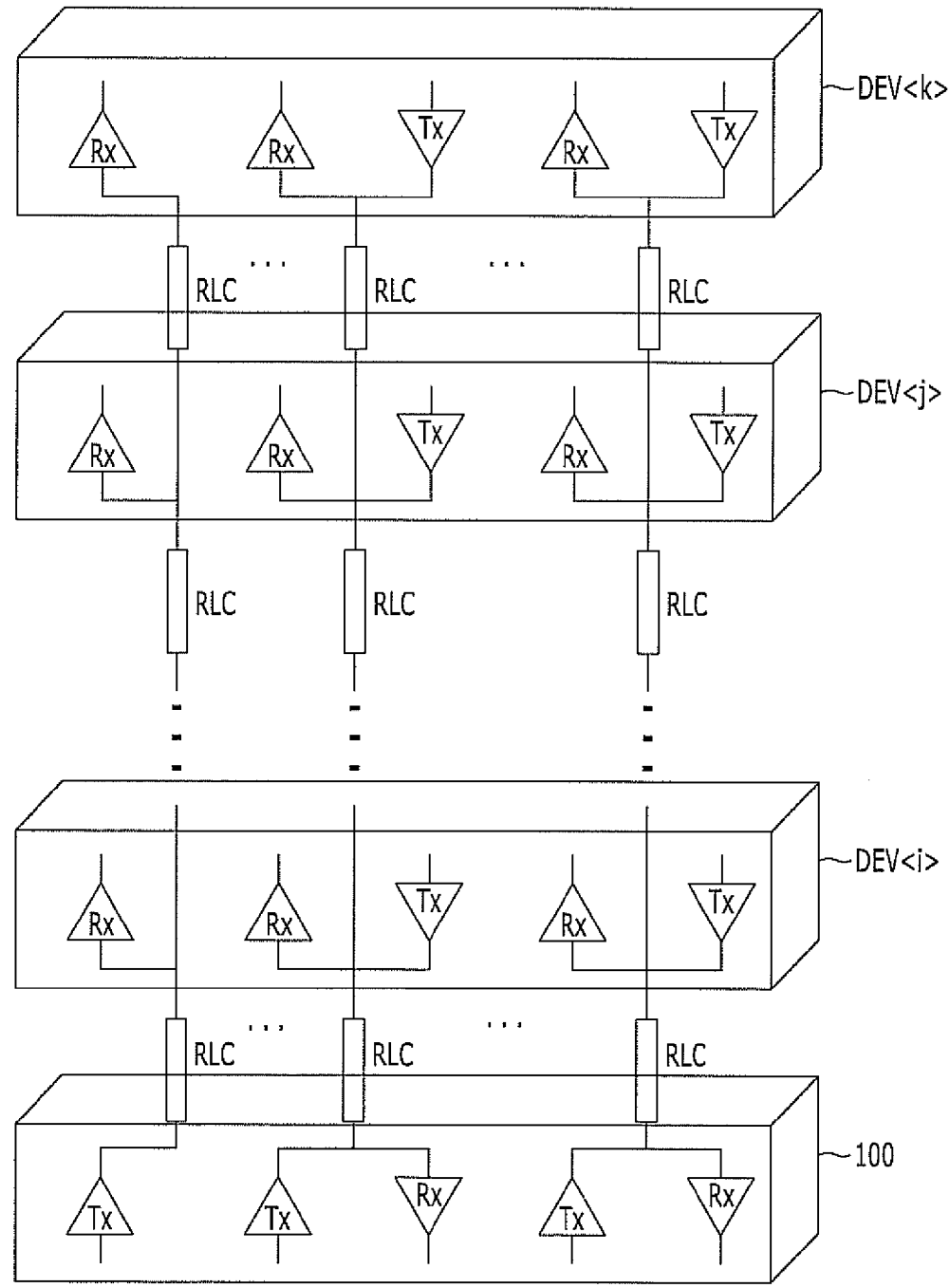
FIG. 2 is a diagram illustrating channels formed as TSVs between the master device and the slave devices and RLC components occurring in the channels.

The master device 400 and the slave devices DEV(1), DEV(2), . . . , DEV(i), DEV(j), and DEV(k) in accordance with the exemplary embodiment of the present invention are arranged as shown in FIG. 1B. That is, the slave devices DEV(1), DEV(2), . . . , DEV(i), DEV(j), and DEV(k) may be stacked and coupled to the master device 400 through an interposer 110. The entire system including the master device 400 and the slave devices DEV(1), DEV(2), . . . , DEV(i), DEV(j), and DEV(k) may be implemented in an semiconductor chip package, on the other hand, for example, only the slave devices DEV(1), DEV(2), . . . , DEV(i), DEV(j), and DEV(k) may be implemented in the semiconductor chip package. Furthermore, the master device 400 and the slave devices DEV(1), DEV(2), DEV(i), DEV(j), and DEV(k) may be stacked and formed.

Figure 5:
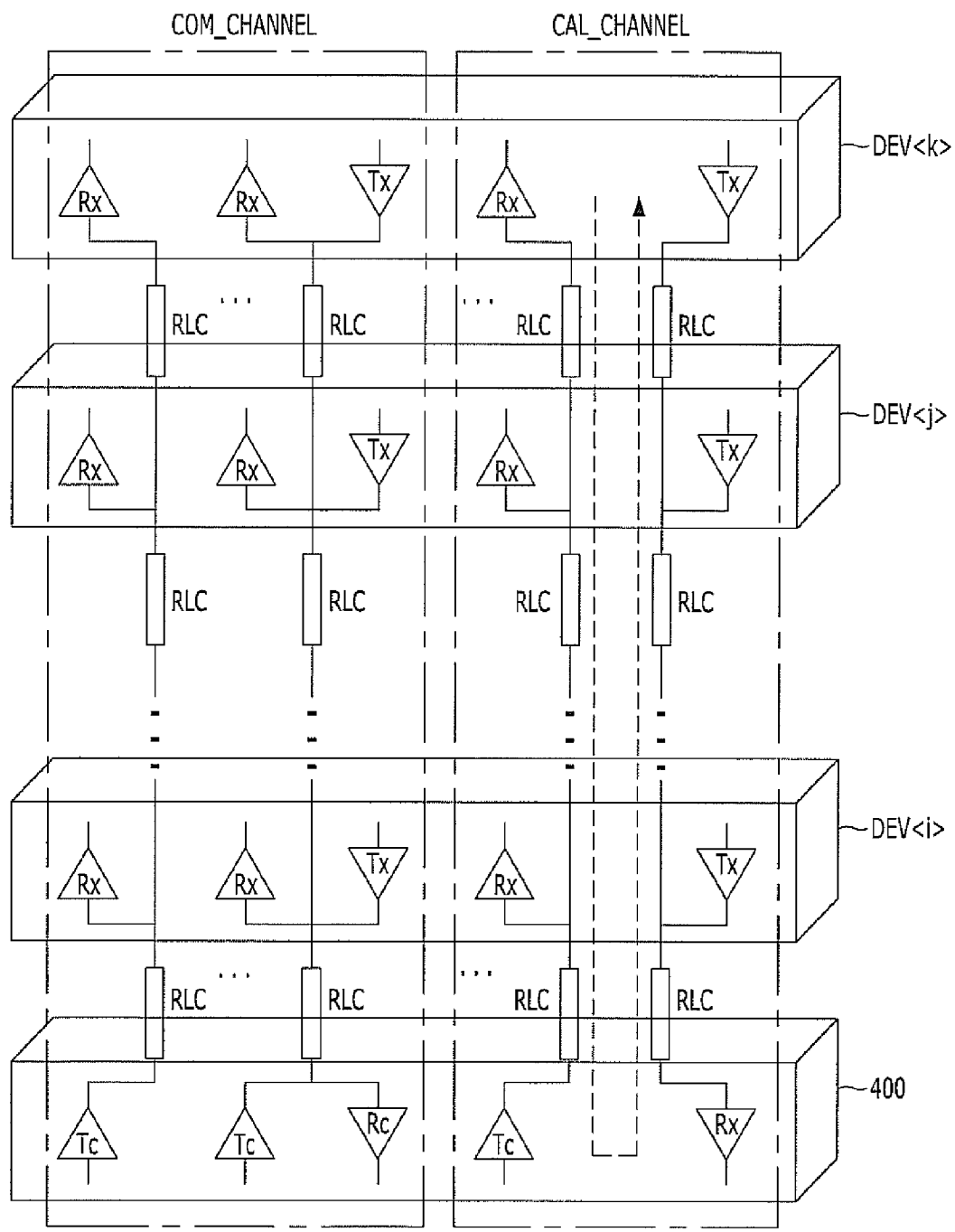
FIG. 5 is a diagram illustrating a communication channel and a calibration channel between the master device and the slave devices in accordance with the embodiment of the present invention.

FIG. 5 is a diagram illustrating the communication channel COM_CHANNEL and the calibration channel CAL_CHANNEL between the master device 400 and the slave devices DEV(1), DEV(2), DEV(i), DEV(j), and DEV(k) in accordance with the exemplary embodiment of the present invention.

Referring to FIG. 5, the communication channel COM_CHANNEL and the calibration channel CAL_CHANNEL are provided between the master device 400 and the slave devices DEV(1), DEV(2), . . . , DEV(i), DEV(j), and DEV(k). When signals are outputted from the slave devices DEV(1), DEV(2), . . . , DEV(i), DEV(j), and DEV(k) through the calibration channel CAL_CHANNEL, the master device 400 receives the outputted signals and feeds back the received signals to the slave devices DEV(1), DEV(2), . . . , DEV(i), DEV(j), and DEV(k) through the calibration channel CAL_CHANNEL. A reception terminal RX receives a signal transferred to the calibration channel CAL_CHANNEL and the signal inputted through the reception terminal RX is outputted through a transmission terminal TX.

FIG. 5 illustrates an example in which the calibration channel CAL_CHANNEL is formed with two TSVs, each of which transmits a signal only in one direction. However, the calibration channel CAL_CHANNEL may be formed with one TSV which transmits a signal in both directions.

Furthermore, FIG. 5 illustrates the calibration channel CAL_CHANNEL and the communication channel COM_CHANNEL as separate channels. However, one of communication channels COM_CHANNEL may be used as the calibration channel. In this case, the corresponding communication channel COM_CHANNEL may serve as a calibration channel during the calibration operation, and may serve as a communication channel during a normal operation.

Figure 6:
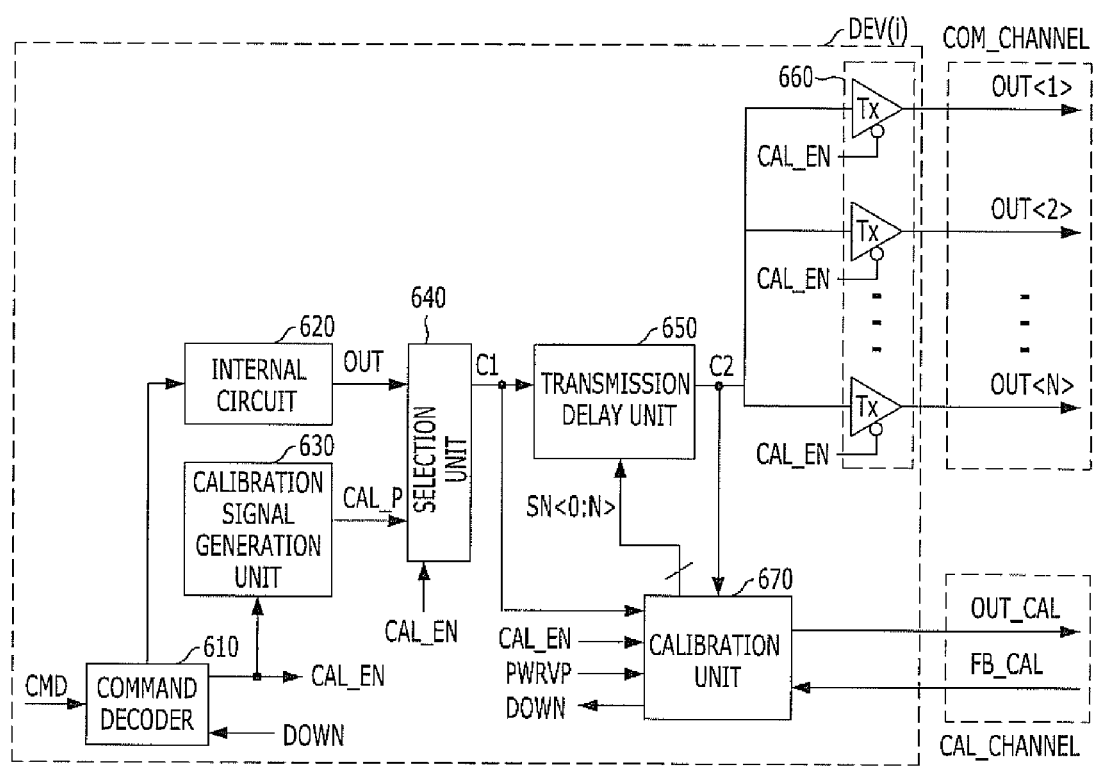
FIG. 6 is a configuration diagram of the slave device in accordance with the embodiment of the present invention.

FIG. 6 is a configuration diagram of the slave device DEV(i) in accordance with the exemplary embodiment of the present invention.

Referring to FIG. 6, the slave device DEV(i) includes a command decoder 610, an internal circuit 620, a calibration signal generation unit 630, a selection unit 640, a transmission delay unit 650, a transmission unit 660, and a calibration unit 670.

The command decoder 610 is configured to decode a command CMD applied from the master device 400 and control an operation of the internal circuit 620. The type of the command CMD may differ depending on which function the slave device DEV(i) is configured to perform. For example, when the slave device DEV(i) is a memory device, commands such as read/write commands will be applied. If the slave device DEV(i) is an arithmetic logic unit, commands related to a variety of operations will be applied. If the command applied from the master device 400 is a calibration command to perform the calibration operation, the command decoder 610 activates a calibration enable signal CAL_EN for enabling the calibration operation. If a down signal DOWN is deactivated after the activation of the calibration enable signal CAL_EN, the command decoder 610 deactivates the calibration enable signal CAL_EN. As will be described below, the deactivation of the down signal DOWN means that the calibration operation of the slave device DEV(i) is completed.

The internal circuit 620 may include a circuit configured to perform main functions of the slave device DEV(i). If the slave device DEV(i) is a memory device, the internal circuit 620 will serve as a circuit configured to store data. If the slave device DEV(i) is an arithmetic logic unit, the internal circuit 620 will serve as a circuit including a variety of arithmetic logics. A transmission signal OUT outputted from the internal circuit 620 indicates a signal which is generated by the operation of the internal circuit 620 and is to be transmitted to the master device 400.

The calibration signal generation unit 630 is configured to generate a calibration signal CAL_P which is periodically activated if the calibration enable signal CAL_EN is activated. The calibration signal CAL_P is a signal which is used for measuring the flight time between the slave device DEV(i) and the master device 400.

The selection unit 640 is configured to select and output the transmission signal OUT outputted from the internal circuit 620 during a normal operation, and select and output the calibration signal CAL_P during the calibration operation. The selection operation of the selection unit 640 is performed in response to the calibration enable signal CAL_EN.

The transmission delay unit 650 is configured to delay the transmission signal OUT outputted from the internal circuit 620, that is, a signal to be transmitted to the master device 400. The delay value of the transmission delay unit 650 is decided according to the flight time measured by the calibration unit 670. This will be described below in detail with reference to corresponding drawings.

The transmission unit 660 is configured to output the transmission signal C2 delayed by the transmission delay unit 650 to the master device 400. The transmission signal C2 delayed by the transmission delay unit 650 is transmitted to the master device 400 through the communication channel COM_CHANNEL. The transmission unit 660 may operate during the deactivation of the calibration enable signal CAL_EN. According to this exemplary embodiment of the present invention, if the calibration enable signal CAL_EN is enabled, the transmission unit 660 does not operate. For reference, a reception unit configured to receive a signal transferred from the master device 400 to the slave device DEV(i) through the communication channel COM_CHANNEL is provided in the slave device DEV(i). However, FIG. 6 does not illustrate the reception unit.

The calibration unit 670 is configured to measure the flight time of the calibration signal CAL_P using the calibration channel CAL_CHANNEL and control the delay value of the transmission delay unit 650 according to the measurement result. The calibration unit 670 may reduce the delay value of the transmission unit 650 in accordance to the measured flight time, and thus the calibration unit 670 may reduce an effect caused by the flight time. For example, when the operation of the calibration unit 670 is completed, the transmission delay unit 650 may have a delay value of [initial delay value (delay value before calibration operation)–flight time].

The slave devices DEV(1), DEV(2), . . . , DEV(j), and DEV(k) other than the slave device DEV(i) may be configured in the same manner as illustrated in FIG. 6. Therefore, each of the slave devices DEV(1), DEV(2), . . . , DEV(i), DEV(j), and DEV(k) may control the delay value of the transmission unit 650 according to the flight time of the slave device. As a result, timings of the slave devices DEV(1), DEV(2), . . . , DEV(i), DEV(j), and DEV(k) having different flight times may be calibrated.

Figure 7:
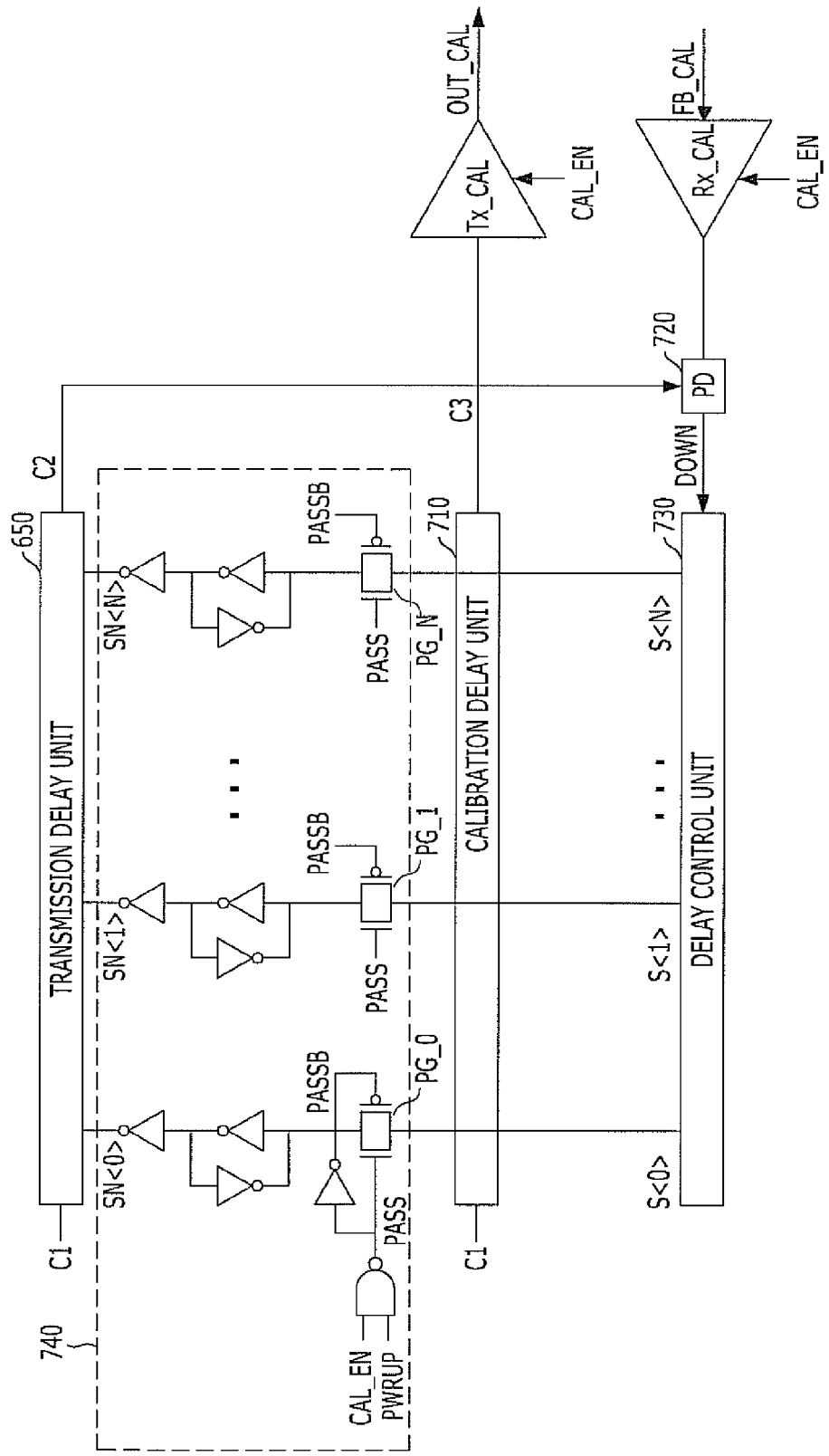
FIG. 7 is a diagram illustrating a calibration unit and a transmission delay unit of FIG. 6 in detail.

FIG. 7 is a diagram illustrating the calibration unit 670 and the transmission delay unit 650 of FIG. 6 in detail.

Referring to FIG. 7, the calibration unit 670 includes a calibration delay unit 710, a calibration transmission unit TX_CAL, a calibration reception unit RX_CAL, a phase comparison unit 720, and a delay control unit 730, and an update unit 740.

According to this exemplary embodiment of the present invention, during the calibration operation period in which the calibration enable signal CAL_EN is activated, the selection unit 640 selects and output the calibration signal CAL_P. That is, during the calibration operation period, a signal of a node C1 may become the calibration signal CAL_P. Hereafter, the signal of the node C1 is referred to as the calibration signal. The calibration signal C1 is delayed by the transmission delay unit 650, and becomes a signal C2 which is referred to as a first signal. Furthermore, the calibration signal C1 is delayed by the calibration delay unit 710, and becomes a signal C3 which is referred to as a second signal.

The calibration delay unit 710 is configured to delay the calibration signal C1 and output the second signal C3. The delay value of the calibration delay unit 710 may differ depending on which signal is activated among output signals S<0:N> of the delay control unit 730. If the signal S<0> is activated, the calibration delay unit 710 has the smallest delay value. If the signal S<N> is activated, the calibration delay unit 710 has the largest delay value.

The delay control unit 730 is configured to activate one of the output signals S<0:N> as an initial value, and, for example, if a down signal DOWN is activated, the delay control unit 730 reduces the delay value of the delay unit 710 at each operation period. That is, if one operation period passes in a state in which the down signal DOWN is activated after the signal S<8> among the output signals of the delay control unit 730 is activated, the signal S<7> becomes activated. Similarly, if one more operation period passes in a state in which the down signal DOWN is activated, the signal S<6> becomes activated.

The transmission delay unit 650 is configured in substantially the same manner as the calibration delay unit 710. However, the transmission delay unit 650 has a difference from the calibration delay unit 710 in that the transmission delay unit 650 does not receive the output signals S<0:N> directly, but receives the output signals S<0:N> through the update unit 740. That is, the delay value of the transmission delay unit 650 is decided depending on output signals SN<0:N> of the update unit 740.

The update unit 740 may include a NAND gate 741, a plurality of pass gates PG_0, PG_1, . . . , PG_N, and a plurality of latches LAT_0, LAT_1, . . . , LAT_N. If one of a calibration enable signal CAL_EN and a power-up signal PWRUP which are inputted to the NAND gate 741 is deactivated to a low level, the pass gates PG_0, PG_1, . . . , PG_N are turned on to pass the output signals S<0:N> of the delay control unit 730 to the transmission delay unit 650. However, when both of the calibration enable signal CAL_EN and the power-up signal PWRUP are in a high state, the pass gates PG_0, PG_1, . . . , PG_N are turned off, and the output signals SN<0:N> of the update unit 740 maintain values stored in the latches LAT_0, LAT_1, . . . , LAT_N. The power-up signal PWRUP, according an example, maintains a low state during the initial operation period in which the power supply of the slave device DEV(i) is unstable. Then, when the power supply of the slave device DEV(i) is stabilized, the power-up signal PWRUP maintains a high state. Therefore, during the initial operation period of the slave device DEV(i), the pass gates PG_0, PG_1, . . . , PG_N are turned on. After the initial operation period of the slave device DEV(i), whether or not to turn on pass gates PG_0, PG_1, . . . , PG_N is determined depending on the logic level of the calibration enable signal CAL_EN.

Simply speaking, the update unit 740 is configured to substantially equalize the initial delay values of the calibration delay unit 710 and the transmission delay unit 650. During the calibration operation, the update unit 740 changes, for example, only the delay value of the calibration delay unit 710. After the calibration operation, the update unit 740 substantially equalizes the delay values of the calibration delay unit 710 and the transmission delay unit 650.

The calibration transmission unit TX_CAL is configured to transmit the second signal C3 to the master device 400 through the calibration channel CAL_CHANNEL, and the calibration reception unit RX_CAL is configured to receive the second signal FB_CAL fed back from the master device 400.

The phase comparison unit 720 is configured to compare the phase of the fed-back second signal FB_CAL with the phase of the first signal C2. The phase comparison unit 720 activates the down signal DOWN to a high level when the phase of the fed-back second signal FB_CAL lags the phase of the first signal C2, and deactivates the down signal DOWN to a low level when the phase of the fed-back second signal FB_CAL leads the phase of the first signal C2.

Now, the entire operation of the calibration unit 670 will be described. (1) During the initial operation of the slave device DEV(i), the calibration unit 670 maintains a state of [the delay value of the calibration delay unit 710=the delay value of the transmission delay unit 650]. (2) When the calibration operation starts, the second signal C3 is transmitted to the master device 400 through the calibration channel CAL_CHANNEL and then fed back. (3) The phases of the fed-back second signal FB_CAL and the first signal C2 are compared. As a result, if the down signal DOWN is activated, the delay value of the calibration delay unit 710 becomes reduced. At this time, the delay value of the transmission delay unit 650 is not changed but maintained by the update unit 740. As the operations (2) and (3) are repeated several times, the delay value of the calibration delay unit 710 is continuously reduced. Finally, the sum of the delay value of the calibration delay unit 710 and the flight time becomes equal to the delay value of the transmission delay unit 650 [the delay value of the calibration delay unit 710+the flight time=the delay value of the transmission delay unit 650]. If the sum of the delay value of the calibration delay unit 710 and the flight time becomes equal to the delay value of the transmission delay unit 650, the down signal DOWN is deactivated. As a result, the calibration enable signal CAL_EN is deactivated, and the delay value of the calibration delay unit 710 is substantially equal to the delay value of the transmission delay unit 650 through the operation of the update unit 740. Finally, the delay value of the transmission delay unit 650 is controlled to [the initial delay value of the transmission delay unit 650−the flight time].

Figure 8:
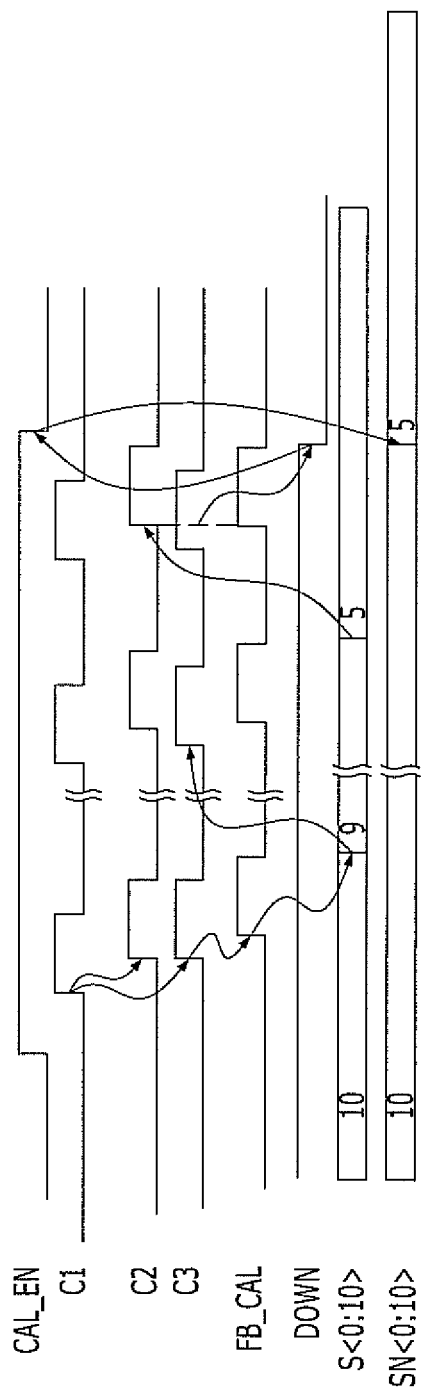
FIG. 8 is a timing diagram showing the operation of the calibration unit.

FIG. 8 is a timing diagram showing the operation of the calibration unit 670.

Referring to FIG. 8, the calibration unit 710 and the transmission delay unit 650 have the same initial value before the calibration operation starts. FIG. 8 shows that, for example, the signal S<10> among the signals S<0:10> and the signal SN<10> among the signals SN<0:10> are activated.

If the calibration enable signal CAL_EN is activated to a high level, the calibration operation starts. The calibration signal C1 which is periodically activated is delayed by the transmission delay unit 650 and becomes the first signal C2. Furthermore, the calibration signal C1 is delayed by the calibration delay unit 710 and becomes the second signal C3. The second signal C3 is transmitted from the slave device DEV(i) to the master device 400, and then fed back as the second signal FB_CAL. The phase comparison unit 720 compares the phase of the first signal C2 with the phase of the fed-back second signal FB_CAL. As a result, the down signal DOWN may be activated. The delay value of the delay unit 720 is reduced by the down signal DOWN. That is, the signal S<9> among the signals S<0:10> is activated. As the above-described operation is repeated, the delay value of the calibration delay unit 710 is continuously reduced. Finally, the phase of the fed-back second signal FB_CAL becomes equal to the phase of the first signal C2. As a result, the down signal DOWN is deactivated to a low level, and the calibration enable signal CAL_EN is deactivated to a low level. Then, the calibration operation is completed. Furthermore, the delay values of the calibration delay unit 710 and the transmission delay unit 650 are controlled to have substantially the same value by the update unit 740. After the calibration operation is completed, according an example, the signal S<5> among the signals S<0:10> is activated, and the signal SN<5> among the signals SN<0:10> is activated. Through the activation of the signals, it can be seen that the delay values of the calibration delay unit 710 and the transmission delay unit 650 becomes substantially equal.

Figure 9:
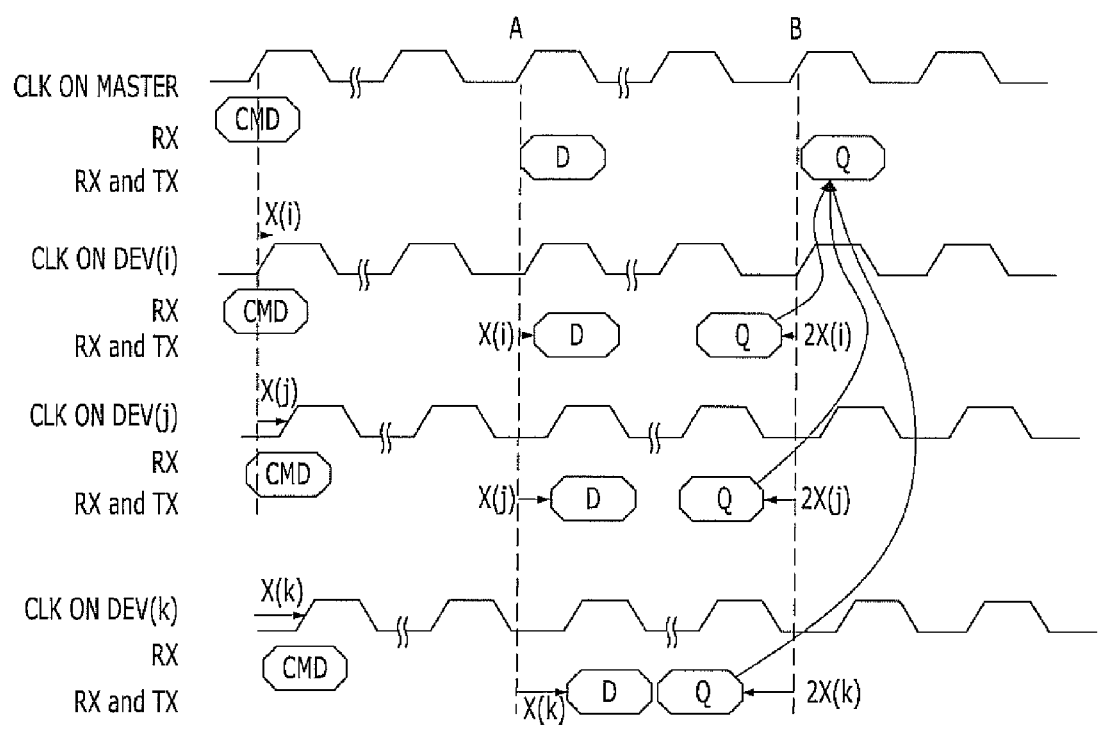
FIG. 9 is a diagram showing signal transmission timing between the master device and the slave devices.

FIG. 9 is a diagram showing signal transmission timing between the master device 400 and the slave devices DEV(i), DEV(j), and DEV(k).

Figure 3:
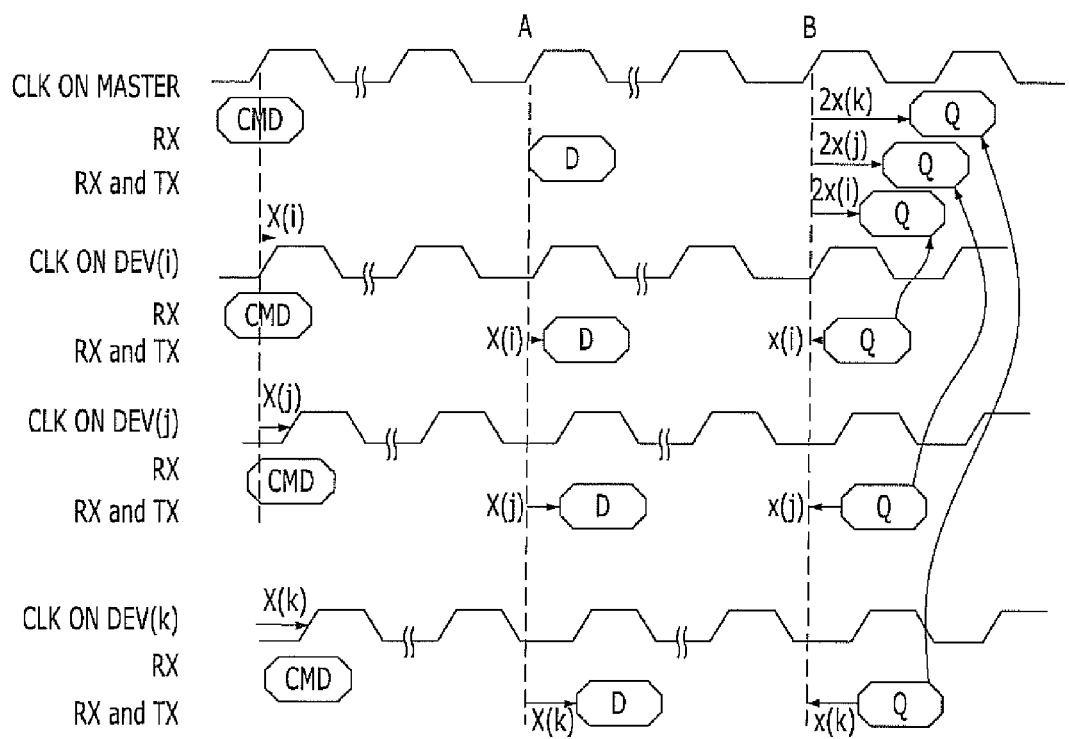
FIG. 3 is a diagram showing timing variations in signal transmission between the master device and the slave devices, which occur depending on differences in channel length.

Referring to FIG. 9, the commands CMD and the data D transferred from the master device 400 to the slave devices DEV(i), DEV(j), and DEV(k) are delayed by X(i), X(j), and X(k), respectively. The slave device DEV(i) transmits the output data Q to the master device 400 at timing which is faster by 2*X(i) than in FIG. 3. The slave device DEV(j) transmits the output data Q to the master device 400 at timing which is faster by 2*X(j) than in FIG. 3. The slave device DEV(k) transmits the output data Q to the master device 400 at timing which is faster by 2*X(k) than in FIG. 3.

Referring to FIG. 9, it can be seen that the master device 400 receives the data Q at the same timing, regardless of with which slave device the master device 400 communicates among the slave devices DEV(i), DEV(j), and DEV(k). That is, differences in flight time between the slave devices DEV (i), DEV(j), and DEV(k) may be reduced/minimized.

Referring to FIGS. 4 to 8, the method for operating the system including the master device and the slave devices in accordance with the exemplary embodiment of the present invention will be described.

The method for operating the system in accordance with the exemplary embodiment of the present invention includes a step in which the slave device DEV(i) transmits a calibration signal OUT_CAL to the master device 400, a step in which the master device 400 receives the calibration signal and feeds back the received calibration signal to the slave device DEV (i), a step in which the slave device DEV(i) measures a flight time by using the fed-back calibration signal FB_CAL, and a step in which the slave device DEV(i) controls the delay value of a communication signal to be transmitted to the master device 400 by using the measured flight time.

The system may include a plurality of slave devices DEV (i), DEV(j), and DEV(k). The above-described process may be performed between the respective slave devices DEV(i), DEV(j), and DEV(k) and the master device 400.

According to an example, the initial delay value of the communication signal becomes reduced by a value corresponding to the flight time of the calibration signal. Therefore, the delay value of the communication signal of the slave device DEV(i) is controlled to [initial delay value−2*X(i)], the delay value of the communication signal of the slave device DEV(j) is controlled to [initial delay value−2*X(j)], and the delay value of the communication signal of the slave device DEV(k) is controlled to [initial delay value−2*X(k)].

In accordance with the exemplary embodiments of the present invention, the flight time of the signal transmitted between the master device and the slave device is measured, and the delay valued of the signal to be transmitted to the master device from the slave device is controlled by reflecting the measured flight time.

Therefore, regardless of the distance differences between the master device and the slave devices, the communication between the master device and the slave devices may be performed at the substantially same timing.

While the present invention has been described with respect to the specific embodiments, it will be apparent to those skilled in the art that various changes and modifications may be made without departing from the spirit and scope of the invention as defined in the following claims.

What is claimed is:

1. A slave device for communicating with a master device, the slave device comprising:
    a calibration signal generation unit configured to:
        generate a calibration signal in response to a calibration enable signal generated based on a command from the master device, and
        send the calibration signal to the master device;
    a transmission unit configured to:
        receive a signal from an internal circuit of the slave device only during a time when the calibration enable signal is disabled, and
        send the signal to the master device through a communication channel;
    a calibration unit configured to:
        measure a flight time of the calibration signal that is sent to the master device, and
        measure a flight time of the calibration signal that is sent back from the master device; and
    a transmission delay unit configured to:
        receive the signal sent from the internal circuit of the slave device to the transmission unit, and
        delay transmission of the signal by the transmission unit by a value based on a measurement result of the calibration unit.

2. The slave device of claim 1, further comprising:
    a calibration channel communicate the calibration signal from the master device to the calibration unit,
    wherein the communication channel and the calibration channel are a same channel.

3. The slave device of claim 1, wherein, during an operation of the calibration unit, the transmission delay unit is further configured to:
    receive the calibration signal, and
    output a delayed calibration signal as a first signal.

4. The slave device of claim 3, wherein the calibration unit comprises:
    a calibration delay unit configured to delay the calibration signal and output the delayed calibration signal as a second signal, wherein a delay value of the calibration delay unit is equal to the delay value of the transmission delay unit;
    a calibration transmission unit configured to transmit the second signal to the master device through the calibration channel;
    a calibration reception unit configured to receive the second signal sent back from the master device through the calibration channel;
    a phase comparison unit configured to compare a phase of the sent back second signal with a phase of the first signal;
    a delay control unit configured to control the delay value of the calibration delay unit based on a the comparison result of the phase comparison unit; and
    an update unit configured to control the delay value of the transmission delay unit, such that the transmission delay unit has the same delay value as that of the calibration delay unit when the calibration operation is completed.

5. The slave device of claim 4, wherein the operation of the calibration unit is completed when the phase of the fed-back second signal becomes equal to the phase of the first signal.

6. The slave device of claim 1, wherein the master device and the slave device are arranged in the same chip package.

7. The slave device of claim 6, wherein the communication channel and the calibration channel between the master device and the slave device comprise through silicon vias.

8. A system comprising:
    a master device;
    a slave device configured to be controlled by the master device;
    a communication channel between the master device and the slave device; and
    a calibration channel between the master device and the slave device, and
    wherein the slave device comprises:
        a transmission unit configured to:
            receive a calibration enable signal, generated based on a command from the master device, from a calibration signal generation unit, and receive a signal from an internal circuit of the slave device only during a time when the calibration enable signal is disabled, wherein the signal is to be sent to the master device;

a calibration unit configured to:
measure a flight time of a calibration signal sent to the master device,
measure a flight time of the calibration signal sent back from the master device through the calibration channel, and
control a delay amount of the signal to be sent to the master device based on the measured flight times.

9. The system of claim 8, further comprising:
a plurality of slave devices that are arranged in a single chip package.

10. The system of claim 9, wherein the communication channel and the calibration channel comprise through silicon vias.

11. The system of claim 8, wherein the master device comprises a memory controller, and the slave device comprises a memory device.

12. A method for operating a system comprising a master device and a slave device, the method comprising:

setting, via a transmission delay unit and a calibration unit, associated with the slave device, an initial delay value to transmit data from the slave device to the master device;

generating, at a calibration signal generation unit, a calibration signal in response to a calibration enable signal generated based on a command from the master device;

receiving, at a transmission unit, a signal from an internal circuit of the slave device only during a time when the calibration enable signal is disabled;

receiving, at the calibration unit, the calibration signal from the transmission delay unit;

delaying the calibration signal using the calibration unit;

sending, via calibration unit, the delayed calibration signal to the master device;

receiving the calibration signal by the master device;

sending, via the master device, the calibration signal back to the slave device;

measuring a flight time of the calibration signal to and from the master device;

comparing a phase of the calibration signal sent from the transmission delay unit with a phase of the delayed calibration signal sent back from the master device; and adjusting the initial delay value of a slave device to a delay value that is inversely proportional to the measured flight times, based on the comparison.

* * * * *